US011576007B2

(12) United States Patent
Brunner et al.

(10) Patent No.: US 11,576,007 B2
(45) Date of Patent: Feb. 7, 2023

(54) SAFETY SYSTEM AND METHOD OF LOCALIZATION

(71) Applicant: SICK AG, Waldkirch (DE)

(72) Inventors: Fabio Brunner, Waldkirch (DE); Markus Hammes, Waldkirch (DE); Mathias Ams, Waldkirch (DE)

(73) Assignee: SICK AG, Waldkirch (DE)

( * ) Notice: Subject to any disclaimer, the term of this patent is extended or adjusted under 35 U.S.C. 154(b) by 149 days.

(21) Appl. No.: 17/143,290

(22) Filed: Jan. 7, 2021

(65) Prior Publication Data

US 2021/0235228 A1    Jul. 29, 2021

(30) Foreign Application Priority Data

Jan. 29, 2020   (DE) .......................... 102020102155.0

(51) Int. Cl.
*H04W 24/00*   (2009.01)
*H04W 24/08*   (2009.01)
(Continued)

(52) U.S. Cl.
CPC ........... *H04W 4/029* (2018.02); *G01S 5/0294* (2013.01); *G01S 5/02216* (2020.05); *G01S 5/04* (2013.01)

(58) Field of Classification Search
CPC ....... H04W 4/029; H04W 4/00; H04W 4/023; H04W 4/33; H04W 4/38; H04W 4/40; H04W 4/90
(Continued)

(56) References Cited

U.S. PATENT DOCUMENTS 8,965,677 B2 * 2/2015 Breed ................. G01S 19/50
701/301
2003/0191568 A1 * 10/2003 Breed ............... B60W 40/06
701/469
(Continued)

FOREIGN PATENT DOCUMENTS

DE       3224182 C1     7/1986
DE   102005000732 A1    7/2006
(Continued)

OTHER PUBLICATIONS

German Search Report dated Sep. 18, 2020 corresponding to application No. 102020102155.0.

*Primary Examiner* — Joseph Arevalo
(74) *Attorney, Agent, or Firm* — Nath, Goldberg & Meyer; Jerald L. Meyer; Stanley N. Protigal (57) ABSTRACT

A safety system and a method for localizing at least one object having a control and evaluation unit have at least one radio location system. The radio location system has at least three arranged radio stations. Position data of the object can be determined by means of the radio location system and can be transmitted to the control and evaluation unit. At least three radio transponders are arranged at the object, each arranged spaced apart from one another and the three radio transponders form different points on a plane and unambiguously define the plane in space. The control and evaluation unit is configured to compare the position data of the radio transponders and to form checked position data of the object. The control and evaluation unit is configured to form orientation data of the object from the position data of the radio transponders.

15 Claims, 6 Drawing Sheets

(51) Int. Cl.
*H04W 28/20* (2009.01)
*H04W 4/02* (2018.01)
*H04W 4/029* (2018.01)
*G01S 5/02* (2010.01)
*G01S 5/04* (2006.01)

(58) Field of Classification Search
USPC .......................... 455/456.1, 456.3, 558, 500
See application file for complete search history.

(56) References Cited

U.S. PATENT DOCUMENTS

| | | | |
|---|---|---|---|
| 2016/0274586 A1 | 9/2016 | Stubbs et al. | |
| 2016/0363664 A1 | 12/2016 | Mindell et al. | |
| 2021/0156951 A1* | 5/2021 | Brunner | G01S 5/0264 |
| 2021/0227372 A1* | 7/2021 | Hammes | H04W 4/38 |
| 2021/0399911 A1* | 12/2021 | Jorasch | H04L 65/403 |

FOREIGN PATENT DOCUMENTS

| | | |
|---|---|---|
| DE | 102013208678 A1 | 11/2014 |
| DE | 102010037739 B4 | 7/2015 |
| DE | 202017104603 U1 | 12/2018 |
| WO | 2005012934 A1 | 2/2005 |
| WO | 2016144765 A1 | 9/2016 |

\* cited by examiner

SAFETY SYSTEM AND METHOD OF LOCALIZATION

FIELD

The present invention relates to a safety system and to a method of localization.

BACKGROUND

Automated guided vehicles (abbreviated: AGV) are confronted with many situations, for example, in which exact position information is required, e.g. before the start of a safety task.

Current radio signal based localization systems can deliver position information whose accuracy is as a rule between +/−2 meters and +/−20 cm, depending on the radio frequency technique and the configuration of the overall system, but also depending on environmental influences.

It is furthermore necessary to satisfy specific demands, including the reliability of the sensor (duality, MTTF, redundancy) and the diagnostic coverage—i.e. the ability to check the sensor for possible errors in the system. In the ideal case, a localization safety system based on triangulation will carry out these checks.

A localization can take place in a variety of ways, e.g. by reading markings on the floor (e.g. RFID, adhesive tape, barcode), by navigation on the basis of a reaction from a detection of the time of flight, that provide a distance from the circumjacent objects that is then compared with a map, or by triangulation on the basis of three or more stations such as was implemented with UWB, GPS and other technologies.

SUMMARY

It is an object of the invention to provide an improved safety system for position detection.

The object is satisfied by a safety system for localizing at least one object having a control and evaluation unit, having at least one radio location system, wherein the radio location system has at least three arranged radio stations, wherein position data of the object can be determined by means of the radio location system, wherein the position data from the radio station of the radio location system can be transmitted to the control and evaluation unit, wherein at least three radio transponders are arranged at the object, wherein all three radio transponders are each arranged spaced apart from one another and the three radio transponders form different points of a plane and unambiguously define the plane in space, wherein the control and evaluation unit is configured to compare the position data of the radio transponders and to form checked position data of the object, and wherein the control and evaluation unit is configured to form orientation data of the object from the position data of the radio transponders.

The object is further satisfied by a method of localizing at least one object having a control and evaluation unit, having at least one radio location system, wherein the radio location system has at least three arranged radio stations, wherein position data of the object are determined by means of the radio location system, wherein the position data from the radio station of the radio location system are transmitted to the control and evaluation unit, wherein at least three radio transponders are arranged at the object, wherein all three radio transponders are each arranged spaced apart from one another and the three radio transponders form different points of a plane and unambiguously define the plane in space, wherein the control and evaluation unit compares the position data of the radio transponder and forms checked position data of the object, and wherein the control and evaluation unit forms orientation data of the object from the position data of the radio transponders.

Two of the radio transponders are spaced apart from one another on an imaginary straight line. The third radio transponder is outside this imaginary straight line. The three radio transponders therefore form the corners of an imaginary triangle and are thus arranged in a triangular manner in space. An unambiguous location or orientation and an unambiguous position of the object can thereby be determined.

The radio location is, here, for example, based on a triangulation of the radio transponders at the object. At least three radio stations that can detect the respective radio transponders are required for this purpose. The distance between the respective radio stations is known to the radio location system here. The radio stations are arranged in a stationary manner.

It is preferably a real time locating system (RTLS). The radio transponders are here arranged at the object. The radio stations receive the radio signals from the radio transponders and can thus determine their position and so the position of the object.

In this respect, position data are transmitted from the radio location system, namely the radio stations, to the control and evaluation unit.

The radio location system can be radio frequencies of radio networks such as wireless LAN or WiFi. A 2.4 GHz or a 5 GHz band is, for example, used at a bandwidth of 20 MHz or 40 MHz, The radio location system can also be radio frequencies of radio links such as Bluetooth. Radio frequencies of 2.402 and 2.480 GHz are used here. The advantage of these frequencies is that they may be operated worldwide without a license. Ranges from 0 to 100 m can be reached depending on the power used. The ranges and the associated maximum powers are divided into classes 1 to 3.

The proposed solution provides a simple way of achieving a higher reliably for a safety signal and a possibility of knowing the alignment of the vehicle and simultaneously of carrying out a quality check of the received signals with the final aim of achieving a stable, reliable, and more exact safety task. This is achieved by the use of two or more localization tags and checks between the outputs.

With knowledge or on the presence of the information of the actual relative positions of the radio transponders with respect to one another measured distances and position permit conclusions on the current accuracy and plausibility of the position data. This is in particular of advantage for the safety engineering use.

In a further development of the invention, the object is a movable object, a mobile machine, or a person.

The movable machine or mobile machine can, for example, be a guideless vehicle, a driverless vehicle or autonomous vehicle, an automated guided vehicle (AGV), an automatically mobile robot (AMR), an industrial mobile robot (IMR), or a robot having movable robot arms. The movable machine thus has a drive and can be moved in different directions.

The person can, for example, be an operator or a service engineer. The radio transponders are arranged at the clothing of the person, for example. It can here, for example, be a vest to which the radio transponders are firmly fixed. The radio transponders are arranged, for example, at the shoulders and in the chest and back areas. The radio transponders can, however, also be arranged at different locations on the person.

In a further development of the invention, the distances between the radio transponders are known to the control and evaluation unit. It is thereby possible to associate possibly determined objects having specific distances of the radio transponders with specific stored objects and to recognize them. Specific objects can thus be identified by individual distances of the radio transponders. For example, specific object classes such as specific different vehicles, different persons, etc. can be identified on the basis of the individual arrangement of the radio transponders.

In a further development of the invention, the distances between the radio transponders are stored in a memory of the control and evaluation unit. It is thereby possible to teach and store different objects having individual distances of the radio transponders so that the safety system can identify stored objects and can distinguish them from non-stored objects.

In a further development of the invention, at least one actuator is configured to cyclically vary the distances between the radio transponders. The distance of at least two radio transponders thereby varies cyclically, whereby the position detection of the radio transponders is dynamized and thereby becomes testable, whereby errors in the position detection and in the detection of the orientation are avoided.

The distances of the radio transponders are thus variable, with the variable distance also being known here. The distance can, for example, be measured here, in particular cyclically measured.

The actuator can, for example, be an actuator having a linear movement or a rotary movement, with the linear movement or rotary movement taking place cyclically with a period duration.

The actuator can, for example, be an electric drive, a pneumatic drive, or a hydraulic drive.

In a further development of the invention, the radio stations each face in different directions. The radio stations are, for example, arranged in annular form and the direction is aligned to a central common point. For example, at least four radio stations can be arranged in the corners of a room and a respective one in the room center.

In a further development, the directions of the radio stations are cyclically variable by actuators. A larger spatial zone can thereby be detected without having to arranged additional radio stations. The directions are, for example, cyclically varied in a specific angular range, for example at least 30°. at least 60°, or at least 90°.

The actuators can, for example, be electromagnetic actuators or electric actuators.

In a further development of the invention, the control and evaluation unit is configured to respectively determine a position of the radio transponders at different points in time and to determine a speed, an acceleration, and/or a movement direction of the radio transponders from it.

A route of an object, of a movable machine, or of a vehicle can thereby be tracked, for example, and an action can, for example, be triggered in dependence on the movement direction or on the movement speed. The object can, for example, be positioned with target precision.

In a further development of the invention, the radio transponders have clocks, with the radio stations likewise having clocks, with the radio stations being configured to read and describe the times of the clocks of the radio transponders and with the radio stations being configured to synchronize the times of the radio transponders and with the radio stations being configured to compare the times of the radio transponders with the times of the radio stations.

A more precise position determination is thereby possible that can also be carried out permanently precisely by the synchronization, in particular with moving objects.

In a further development of the invention, at least four, at least six, or at least eight radio transponders are arranged at the object, with two respective transponders being disposed on a respective one straight line, with the straight lines each being perpendicular to one another.

Radio transponders are thereby respectively arranged in pairs, with the respective pairs each having a different orientation. An orientation from every direction is thereby unambiguous. Furthermore, a radio transponder can also be arranged at the point of intersection of the straight lines so that a single radio transponder forms a center or a central position point that can be used as a reference position.

In a further development of the invention, the movable machine has at least one encoder that detects a movement of the movable machine, with the encoder being connected to the control and evaluation unit and the control and evaluation unit being configured to evaluate the movement information of the encoders.

Movement information is thereby present to, for example, test the movement information of the radio transponders. A valid movement can thus be assumed when the encoder and the radio transponders have movement information with the same direction.

In a further development of the invention, classification data of the object can be determined by means of the radio location system, with the classification data being able to be transmitted from the radio station to the control and evaluation unit. An identification of the objects thereby takes place.

The classification data of the object are stored in the radio transponder, for example. The classification data describe the kind of the object and its properties, for example. The classification data can thus, for example, describe functional properties or material properties of the object.

The radio stations can thus read the classification data of the radio transponders and can transmit them to the control and evaluation unit.

In a further development of the invention, the radio location system is an ultra wideband radio location system, with the frequency used being in the range from 3.1 GHz to 10.6 GHz, with the transmission energy amounting to a maximum of 0.5 mW per radio station.

An absolute bandwidth in an ultra wideband radio location system amounts to at least 500 MHz or a relative bandwidth amounts to at least 20% of the central frequency.

The range of such a radio location system amounts, for example, to 0 to 50 m. In this respect, the short time duration of the radio pulses is used for the localization.

The radio location system thus only transmits radio waves having a low energy. The system can be used very flexibly and has no interference.

A plurality of radio stations, for example more than three, are preferably arranged that monitor at least some of the movement zone of the person or of the object.

In a further development of the invention, a change of the safety function of the safety system takes place on the basis of the checked position data by means of the control and evaluation unit.

A change of the safety function of the safety function of the safety system takes place on the basis of position data by means of the control and evaluation unit.

If a predetermined position has been recognized that is stored, for example, the control and evaluation unit can switch over to a different protective measure or safety function. The switching over of the protective measure can comprise, for example, a switching over of measured data contours, a switching over of protected fields, a parameter or shape matching of measured data contours or protected fields, and/or a switching over of the properties of a protected field. The properties of a protected field include, for example, the resolution and/or the response time of the protected field. A switching over of the protective measure can also be a safety function such as a force restriction of the drive to which the switchover is made.

In a further development of the invention, the position data checked by means of the control and evaluation unit are checked for agreement with stored position data of a safe point of interest and if there is agreement, a change of the safety function of the safety system takes place.

The safe point of interest (SPOI) is a simplified variant of a safe positioning that is restricted to a detection of particular positions in an industrial application at which it is necessary to adapt the safety system or a protective device or a safety function of the movable machine to ensure both personal protection and machine availability. The safe point of interest is a synonymous name for a safety location, that is, not a singular point.

In a further development of the invention, the safety system has a map or a map model, with safe points of interest being entered in the map or in the map model and a navigation of the movable machine taking place in the map or in the map model.

The current position and/or location of the movable machine is continuously processed in the control and evaluation unit on the basis of detected environmental contours and the map or the map model is updated. The map has a coordinate system. This kind of position determination is called a simultaneous localization and mapping (SLAM) method. In this respect, at least one position and an associated orientation in the map are known or a position of origin and an orientation of origin in the map are known. Recognized positions and/or contours are continuously entered into the map, whereby the map is expanded or changes of, for example, objects and/or routes are entered into the map.

The invention will also be explained in the following with respect to further advantages and features with reference to the enclosed drawing and to embodiments. The Figures of the drawing show in.

BRIEF DESCRIPTION OF THE DRAWINGS

Figure 8:
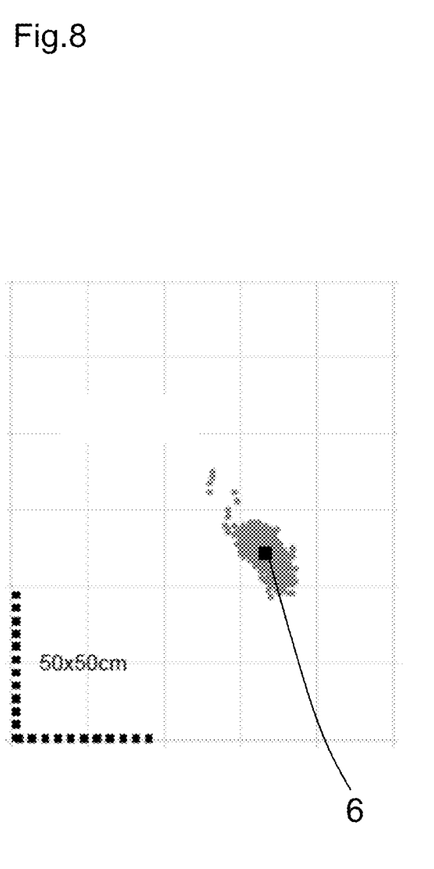
FIG. 8 a respective plurality of positions of a radio transponder.
Figure 9:
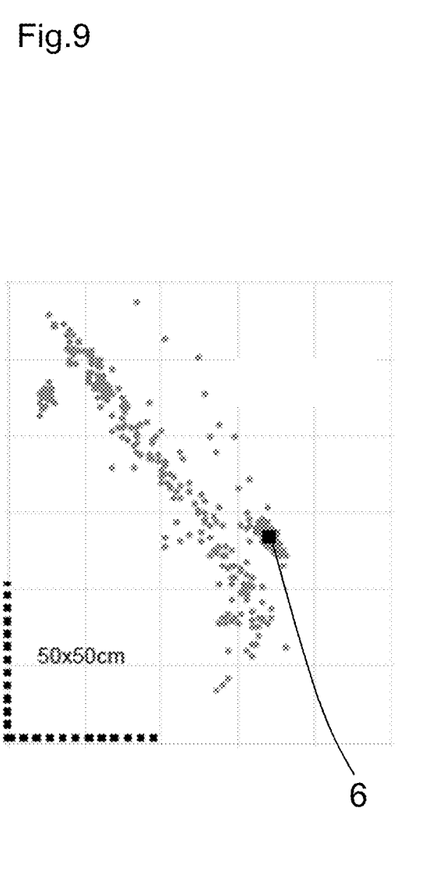

FIG. 9 shows a position determination of a single radio transponder 6 in accordance with FIG. 8 likewise by a multiple measurement. The measured position points are, however, falsified by a person being present and his physical proportion of water. The position can nevertheless be determined by a multiple measurement and averaging of the measured values. The water content of the person means that the radio signals can no longer be assigned exactly to the position of the radio transponder, but are scattered. The scattered position signals are shown as individual points in FIG. 9. The scattering of the radio signals is much higher compared to FIG. 8. A person leads to an attenuation of the radio signals between the radio transponder 6 and the radio stations that are provided for locating the radio transponder. The person is located between the radio transponder 6 and a radio station.

In the following Figures, identical parts are provided with identical reference numerals.

Figure 1:
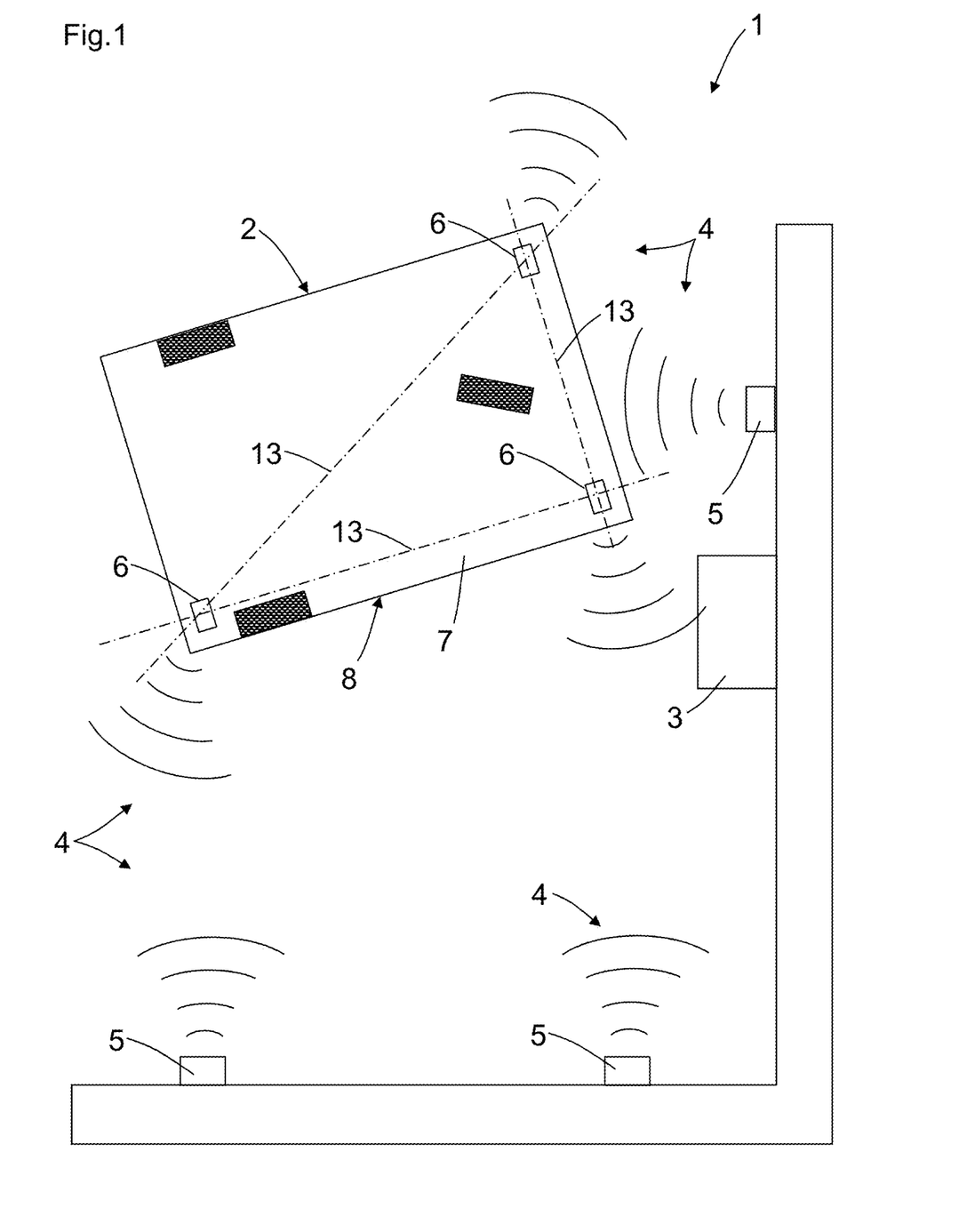
FIG. 1 to FIG. 3 respectively, a safety system in accordance with the invention for localizing an object.

FIG. 1 shows a safety system 1 for localizing at least one object 2 having a control and evaluation unit 3, having at least one radio location system 4, wherein the radio location system 4 has at least three arranged radio stations 5, wherein at least one radio transponder 6 is arranged at the object 2, wherein position data of the object 2 can be determined by means of the radio location system 4, wherein the position data from the radio station 5 of the radio location system 4 can be transmitted to the control and evaluation unit 3, wherein at least three radio transponders 6 are arranged at the object 2, wherein all three radio transponders 6 are each arranged spaced apart from one another and the three radio transponders 6 form different points on a plane and unambiguously define the plane in space, wherein the control and evaluation unit 3 is configured to compare the position data of the radio transponders 6 and to form checked position data of the object 2, and wherein the control and evaluation unit 3 is configured to form orientation data of the object 2 from the position data of the radio transponders 6.

DETAILED DESCRIPTION

Two of the radio transponders 6 are spaced apart from one another on an imaginary straight line 13. The third radio transponder is outside this imaginary straight line 13. The three radio transponders 6 therefore form the corners of an imaginary triangle and are thus arranged in a triangular manner in space. An unambiguous location or orientation and an unambiguous position of the object 2 can thereby be determined.

The radio location is, here, for example, based on a triangulation of the radio transponders 6 at the object 2. At least three radio stations 5 that 6 detect the respective radio transponders 6 are required for this purpose. The distance between the respective radio stations 5 is known to the radio location system 4 here. The radio stations 5 are arranged in a stationary manner.

It is preferably a real time locating system (RTLS). The radio transponders 6 are here arranged at the object 2. The radio stations, 5 receive the radio signals from the radio transponders 6 and can thus determine their position and so the position of the object 2.

In this respect, position data are transmitted from the radio location system 4, namely the radio stations 5, to the control and evaluation unit 3.

In accordance with FIG. 1, the object 2 is a movable object 7, in particular a mobile or movable machine 8. The movable machine 8 thus has a drive and can be moved in different directions.

Figure 2:
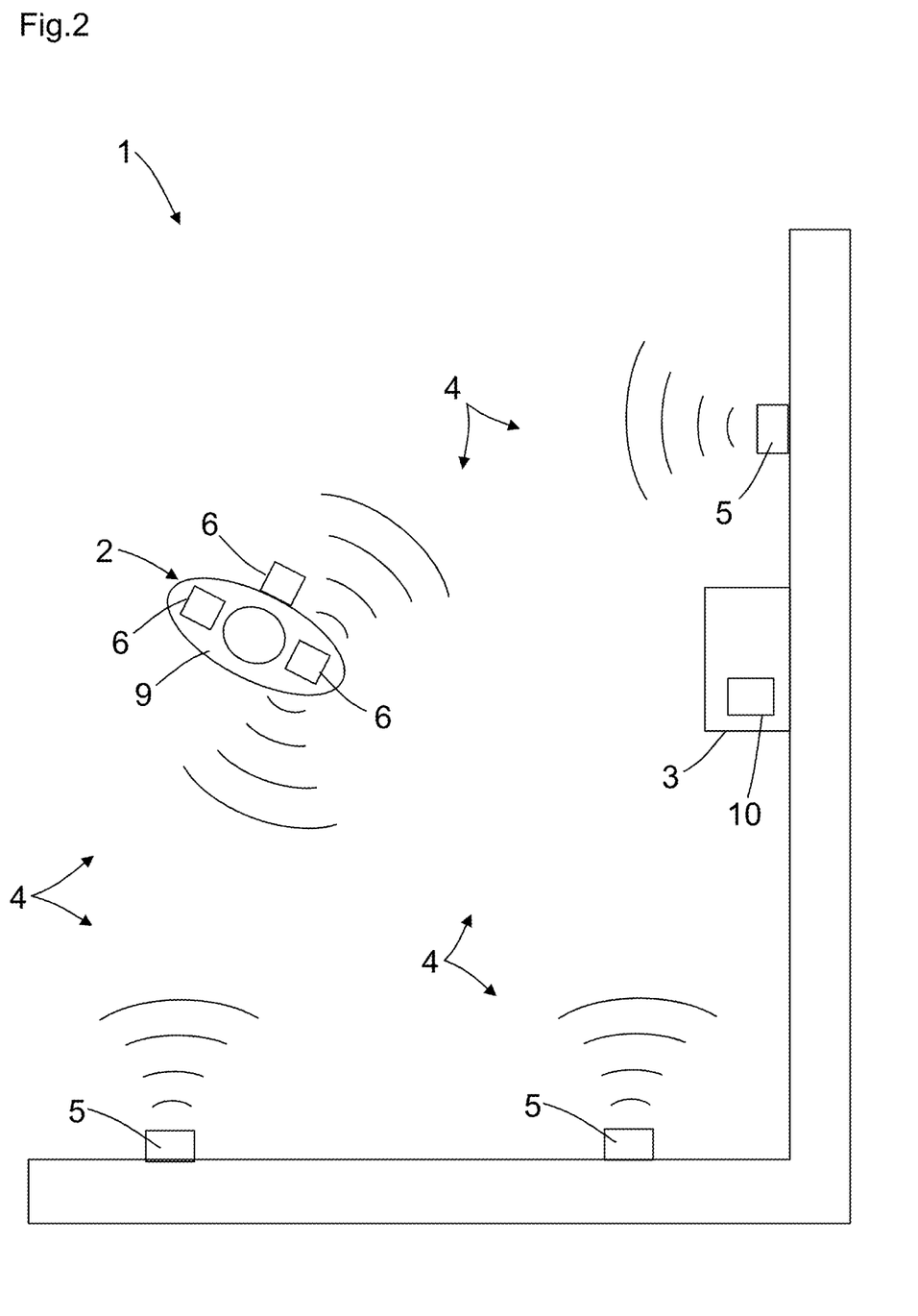

In accordance with FIG. 2, the object 2 is a person 9. The person 9 can, for example, be an operator or a service engineer. The radio transponders 6 are arranged at the clothing of the person 9, for example. It can here, for example, be a vest to which the radio transponders 6 are firmly fixed. The radio transponders 6 are arranged, for example, at the shoulders and in the chest and back areas. The radio transponders 6 can, however, also be arranged at different locations on the person 9.

In accordance with FIG. 2, the distances and/or the location between the radio transponders 6 is optionally known to the control and evaluation unit 3. It is thereby possible to associate possibly determined objects 2 having specific distances of the radio transponders 6 with specific stored objects 2 and to recognize them. Specific objects 2 having individual distances of the radio transponders 6 can thus be identified. For example, specific object classes such as specific different vehicles, different persons 9, etc. can be identified on the basis of the individual arrangement of the radio transponders 6.

In accordance with FIG. 2, the distances between the radio transponders 6 are stored in a memory 10 of the control and evaluation unit 3. It is thereby possible to teach and store different objects 2 having individual distances of the radio transponders 6 so that the safety system 1 can identify stored objects 2 and can distinguish them from non-stored objects 2.

Figure 3:
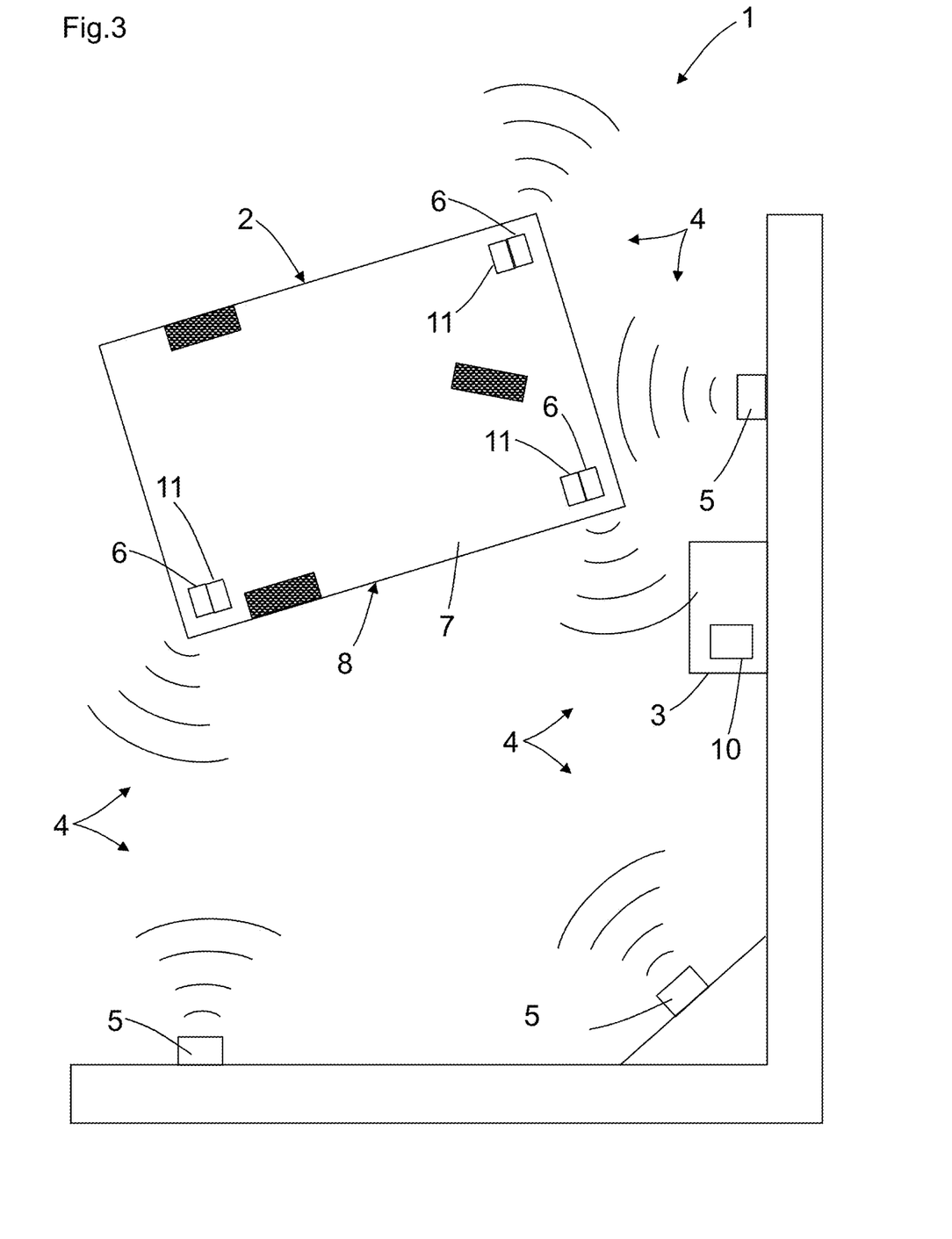

In accordance with FIG. 3, at least one actuator 11 is configured to cyclically vary the distances between the radio transponders. The distance of at least two radio transponders 6 thereby varies cyclically, whereby the position detection of the radio transponders 6 is dynamized and thereby becomes testable, whereby errors in the position detection and in the detection of the orientation are avoided.

The actuator 11 can, for example, be an actuator 11 having a linear movement or a rotary movement, with the linear movement or rotary movement taking place cyclically with a period duration.

The actuator 11 can, for example, be an electric drive, a pneumatic drive, or a hydraulic drive or a hydraulic drive.

In accordance with FIG. 3, the radio stations 5 each face in different directions. The radio stations 5 are, for example, arranged at different walls and the direction is aligned to a central common zone. For example, at least four radio stations 5 can be arranged in the corners of a room and a respective one in the room center.

In accordance with FIG. 3, the directions of the radio stations 5 are cyclically variable by actuators 11. A larger spatial zone can thereby be detected without having to arrange additional radio stations 5. The directions are, for example, cyclically varied in a specific angular range, for example at least 30°. at least 60°, or at least 90°.

The actuators 11 can, for example, be electromagnetic actuators or electric actuators.

In accordance with FIG. 3, the control and evaluation unit 3 is configured to respectively determine a position of the radio transponders 6 at different points in time and to determine a speed, an acceleration, and/or a movement direction of the radio transponders 6 from it.

A route of an object 2, of a movable machine 8, or of a vehicle can thereby be tracked, for example, and an action can, for example, be triggered in dependence on the movement direction or on the movement speed. The object 2 can, for example, be positioned with target precision.

In accordance with FIG. 3, the radio transponders have clocks, with the radio stations 5 likewise having clocks, with the radio stations 5 being configured to read and describe the time of the clocks of the radio transponders 6 and with the radio stations 5 being configured to synchronize the times of the radio transponders 6 and with the radio stations 5 being configured to compare the times of the radio transponders 6 with the times of the radio stations 5.

A more precise position determination is thereby possible that can also be carried out permanently precisely by the synchronization, in particular with moving objects 2.

Figure 4:
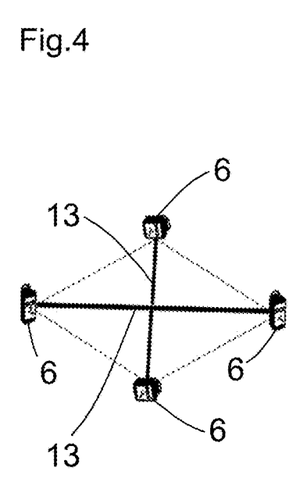
FIG. 4 to FIG. 6 respectively, at least one pairwise arrangement of radio transponders.

In accordance with FIG. 4, at least four radio transponders 6 are arranged at the object 2, with a respective two radio transponders 6 being disposed on a respective straight line 13 or axis, with the straight lines 13 each being perpendicular with respect to one another.

Figure 5:
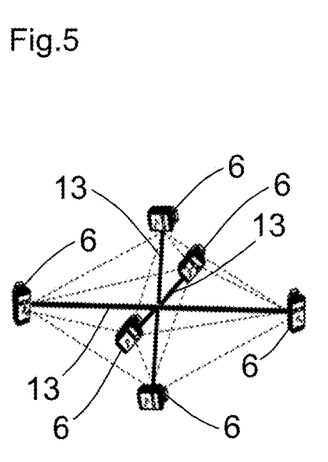

In accordance with FIG. 5, at least six radio transponders 6 are arranged at the object 2, with a respective two radio transponders 6 being disposed on a respective straight line 13 or axis, with the straight lines 13 each being perpendicular with respect to one another.

Figure 6:
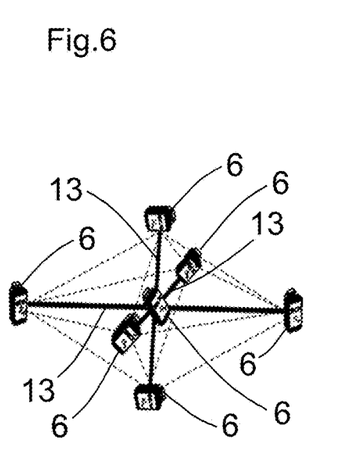

In accordance with FIG. 6, at least eight radio transponders 6 are arranged at the object 2, with a respective two radio transponders 6 being disposed on a respective straight line 13, with the straight lines 13 each being perpendicular with respect to one another. In accordance with FIG. 6 a radio transponder 6 is also optionally arranged at the point of intersection of the straight lines 13 so that a single radio transponder 6 forms a center or a central position point that can be used as a reference position.

In accordance with FIG. 3, classification data of the object can be determined by means of the radio location system, with the classification data being able to be transmitted from the radio station 5 to the control and evaluation unit 3. An identification of the objects 2 thereby takes place.

The classification data of the object 2 are stored in the radio transponder 6, for example. The classification data describe the kind of the object 2 and its properties, for example. The classification data can thus, for example, describe functional properties or material properties of the object 2.

The radio stations 5 can thus read the classification data of the radio transponders 6 and can transmit them to the control and evaluation unit 3.

In accordance with FIG. 3, the radio location system 4 is an ultra wideband radio location system, with the frequency used being in the range from 3.1 GHz to 10.6 GHz, with the transmission energy amounting to a maximum of 0.5 mW per radio station. The range of such a radio location system 4 amounts, for example, to 0 to 50 m. In this respect, the short time duration of the radio pulses is used for the localization.

A plurality of radio stations 5, for example more than three, are preferably arranged that monitor at least some of the movement zone of the person or of the object 2.

In accordance with FIG. 3, a change of the safety function of the safety system 1 takes place on the basis of the checked position data by means of the control and evaluation unit 3.

A change of the safety function of the safety function of the safety system 1 takes place on the basis of position data by means of the control and evaluation unit 3.

If a predetermined position has been recognized that is stored, for example, the control and evaluation unit 3 can switch over to a different protective measure or safety function. The switching over of the protective measure can comprise, for example, a switching over of measured data contours, a switching over of protected fields, a parameter or shape matching of measured data contours or protected fields, and/or a switching over of the properties of a protected field. The properties of a protected field include, for example, the resolution and/or the response time of the protected film. A switching over of the protective measure can also be a safety function such as a force restriction of the drive to which the switchover is made.

In accordance with FIG. 3, the checked position data are checked for agreement with stored position data of a safety point by means of the control and evaluation unit 3 and if there is agreement, a change of the safety function of the safety system takes place.

The safe point of interest (SPOI) is a simplified variant of a safe positioning that is restricted to a detection of particular positions in an industrial application at which it is necessary to adapt the safety system 1 or a protective device or a safety function of the movable machine 8 to ensure both personal protection and machine availability. The safe point of interest is a synonymous name for a safety location, that is, not a singular point.

Figure 7:
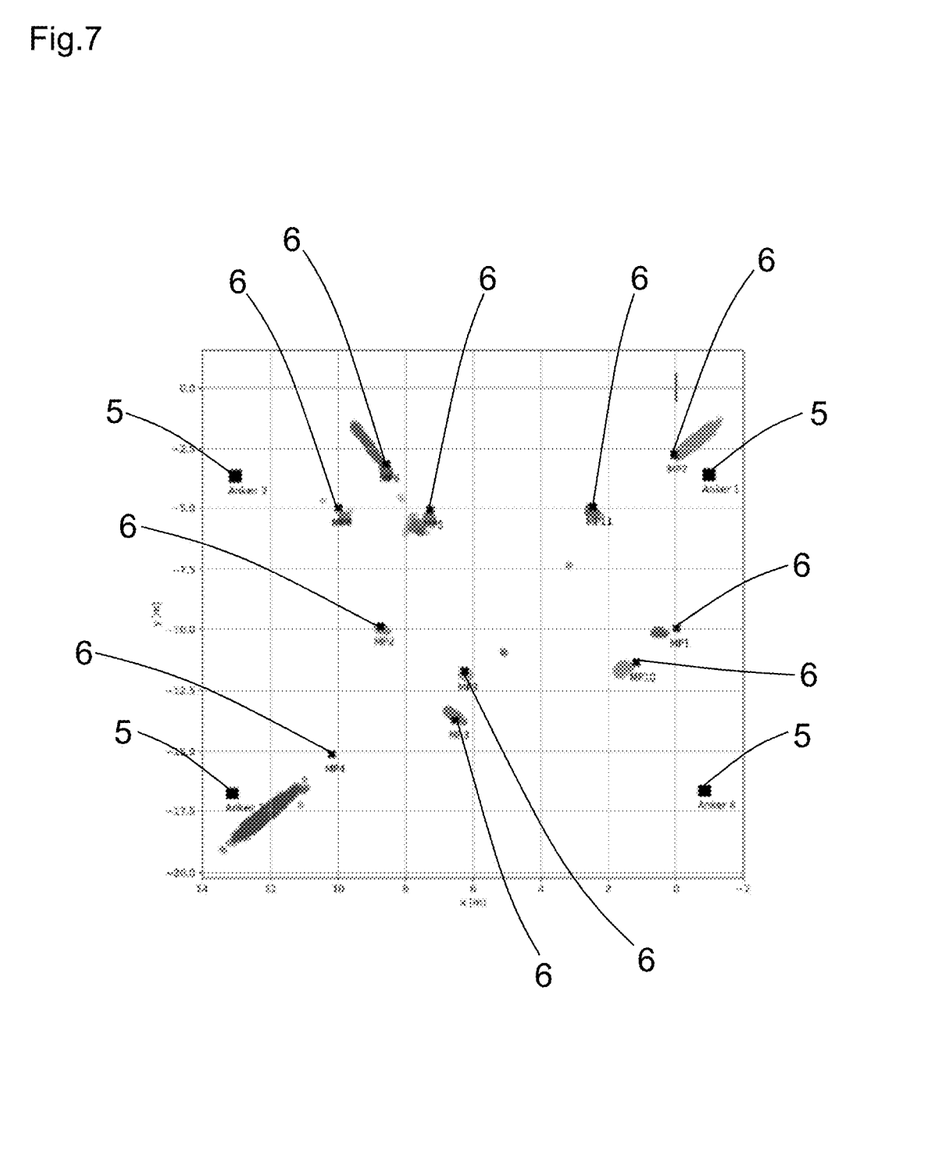
FIG. 7 a representation of radio stations and radio transponders in a Cartesian coordinate system.

Four radio stations 5 are arranged in a Cartesian coordinate system in FIG. 7. The detected positions of the radio transponders 6 are shown. In this respect, a precision of the detection is dependent on the position of the radio transponder 6 with respect to the radio stations 5. Radio transponders 6 arranged centrally between the radio stations 5 are detected with a higher position accuracy than radio transponders 6 that are arranged in the proximity of a radio station 5.

FIG. 8 shows a position determination of a single radio transponder 6 by a multiple measurement. The individual measured position points are averaged, for example.

FIG. 9 shows a position determination of a single radio transponder 6 in accordance with FIG. 8 likewise by a multiple measurement. The measured position points are, however, falsified by a person being present and his physical proportion of water. The position can nevertheless be determined by a multiple measurement and averaging of the measured values.

REFERENCE NUMERALS 1 safety system
2 object
3 control and evaluation unit
4 radio location system
5 radio stations
6 radio transponder
7 movable object
8 movable machine/mobile machine
9 person
10 memory
11 actuators
13 axis/straight line

The invention claimed is:

1. A safety system for localizing at least one object, the safety system comprising:
 a control and evaluation unit, having at least one radio location system,
 wherein the radio location system has at least three arranged radio stations;
 wherein at least one radio transponder is arranged at the object;
 wherein position data of the object can be determined by means of the radio location system;
 wherein the position data can be transmitted from the radio station of the radio location system to the control and evaluation unit,
 wherein at least three radio transponders are arranged at the object, with all three radio transponders each being arranged spaced apart from one another and with the three radio transponders forming different points of a plane and defining the plane unambiguously in space;
 wherein the control and evaluation unit is configured to compare the position data of the radio transponders and to form checked position data of the object;
 wherein the control and evaluation unit is configured to form orientation data of the object from the position data of the radio transponders;
 and wherein position data checked by means of the control and evaluation unit are checked for agreement with stored position data of a safe point of interest and if there is agreement, a change of a safety function of the safety system takes place.

2. The safety system in accordance with claim 1, wherein the object is one of a movable object, a mobile machine and a person.

3. The safety system in accordance with claim 1, wherein distances between the radio transponders are known to the control and evaluation unit.

4. The safety system in accordance with claim 1, wherein distances between the radio transponders are stored in a memory of the control and evaluation unit.

5. The safety system in accordance with claim 1, wherein an actuator is configured to cyclically vary distances between the radio transponders.

6. The safety system in accordance with claim 1, wherein the radio stations face in respective different directions.

7. The safety system in accordance with claim 1, wherein the directions of the radio stations are cyclically variable by actuators.

8. The safety system in accordance with claim 1, wherein the control and evaluation unit is configured to respectively determine a position of the radio transponders at different points in time and to determine a speed, an acceleration, and/or a movement direction of the radio transponders from it.

9. The safety system in accordance with claim 1, wherein the radio transponders have clocks, with the radio stations likewise having clocks, with the radio stations being configured to synchronize the times of the radio transponders, and with the radio stations being configured to compare the times of the radio transponders with the times of the radio stations.

10. The safety system in accordance with claim 1, wherein at least four, at least six, or at least eight radio transponders are arranged at the object, with two respective transponders being disposed on a respective one straight line, with the straight lines each being perpendicular to one another.

11. The safety system in accordance with claim 1, wherein the movable machine has encoders that detect a movement of the movable machine, with the encoder being connected to the control and evaluation unit and the control and evaluation unit being configured to evaluate the movement information of the encoders.

12. The safety system in accordance with claim 1, wherein classification data of the object can be determined by means of the radio location system, with the classification data being able to be transmitted from the radio station to the control and evaluation unit.

13. The safety system in accordance with claim 1, wherein the radio location system is an ultra wideband radio location system, with the frequency used being in the range from 3.1 GHz to 10.6 GHz, and with the transmission energy amounting to a maximum of 0.5 mW per radio station.

14. The safety system in accordance with claim 1, wherein the safety system has a map or a map model, with safe points of interest being entered in the map or in the map model and a navigation of the movable machine taking place in the map or in the map model.

15. A method of localizing at least one object having a control and evaluation unit, having at least one radio location system, wherein the radio location system has at least three arranged radio stations;

wherein at least one radio transponder is arranged at the object;

wherein position data of the object are determined by means of the radio location system;

wherein the position data are transmitted from the radio station of the radio location system to the control and evaluation unit, wherein at least three radio transponders are arranged at the object, with all three radio transponders each being arranged spaced apart from one another and with the three radio transponders forming different points of a plane and defining the plane unambiguously in space;

with the control and evaluation unit comparing the position data of the radio transponders and forming checked position data of the object;

with the control and evaluation unit forming orientation data of the object from the position data of the radio transponders; and with the position data checked by means of the control and evaluation unit are checked for agreement with stored position data of a safe point of interest and if there is agreement, a change of a safety function of the safety system takes place.

* * * * *